United States Patent [19]
Schwartz

[11] Patent Number: 5,379,299
[45] Date of Patent: Jan. 3, 1995

[54] HIGH SPEED PROPAGATION DELAY COMPENSATION NETWORK

[75] Inventor: Paul D. Schwartz, Thurmont, Md.

[73] Assignee: The Johns Hopkins University, Baltimore, Md.

[21] Appl. No.: 76,082

[22] Filed: Jun. 14, 1993

Related U.S. Application Data

[63] Continuation-in-part of Ser. No. 869,581, Apr. 16, 1992, abandoned.

[51] Int. Cl.⁶ .............................................. H04L 7/033
[52] U.S. Cl. .................................. 370/108; 370/105.3; 370/105.2; 375/118
[58] Field of Search ...................... 370/108, 106, 105.4, 370/105.3, 105.1, 105, 100.1, 79; 375/118, 119, 120, 38, 106, 110; 340/825.2

[56] References Cited

U.S. PATENT DOCUMENTS

| | | | |
|---|---|---|---|
| 2,570,207 | 1/1946 | Chetterjea et al. | 370/108 |
| 4,524,448 | 6/1985 | Hüllwegen | 375/118 |
| 4,818,995 | 4/1989 | Takahashi et al. | 375/38 |
| 5,173,617 | 12/1992 | Alsup et al. | 375/119 |

Primary Examiner—Douglas W. Olms
Assistant Examiner—Huy D. Vu
Attorney, Agent, or Firm—Eugene J. Pawlikowski

[57] ABSTRACT

A delay compensating circuit for equalizing the propagation and processing delays from data sources which are read sequentially by a central data processing unit. Data from individual data sources is multiplexed into a real-time composite data stream which contains data from each data source and in which the final data bit from one source is followed, during the next clock cycle, by the first data bit from the next data source. To achieve this order, the total (propagation and processing) delay from each data source is controlled to a fixed amount by adding a compensating delay to each data source and adjusting delay automatically following each data transfer based on the occurrence of a known data transition in each data frame.

5 Claims, 3 Drawing Sheets

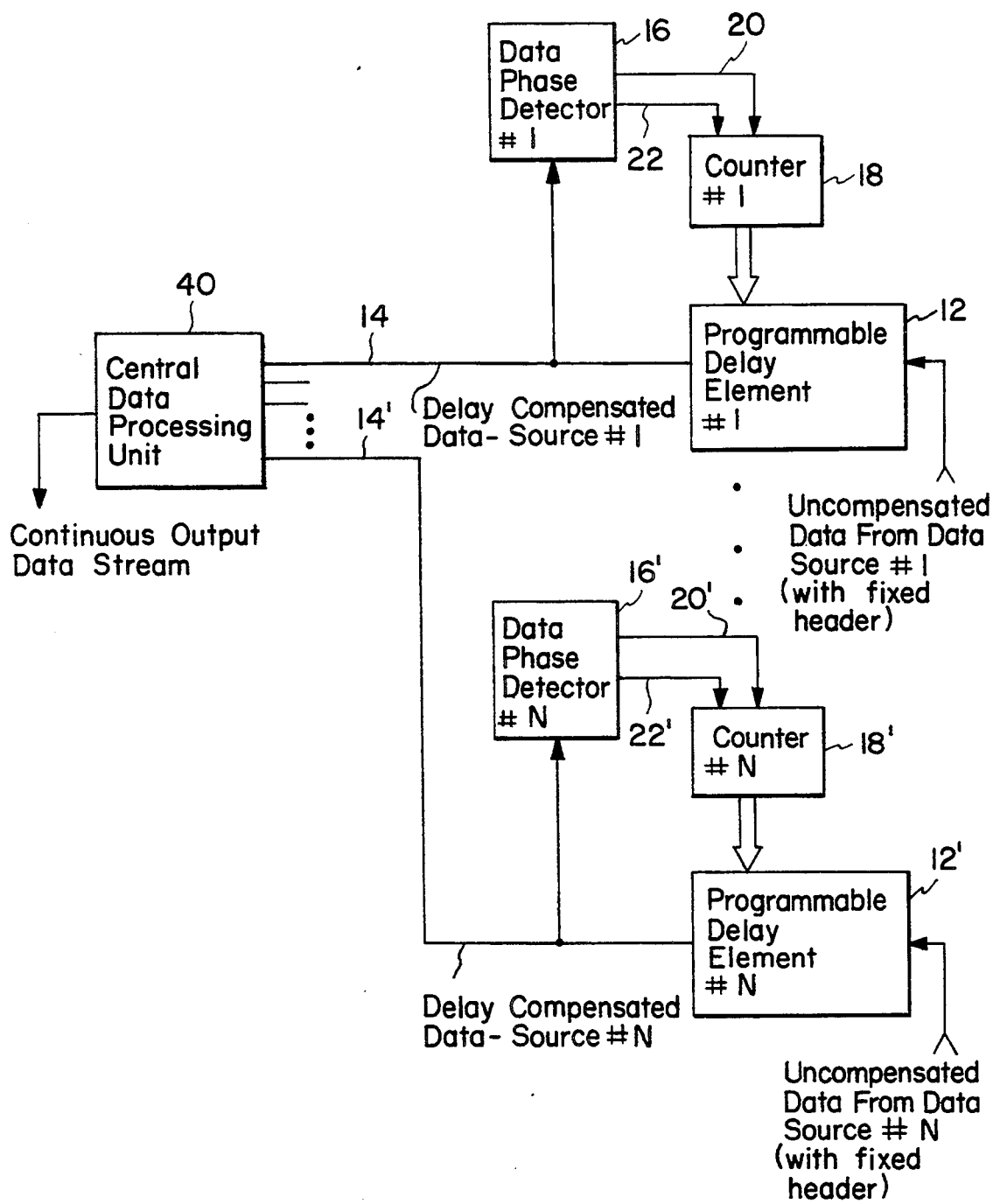

HIGH SPEED PROPAGATION DELAY COMPENSATION NETWORK

STATEMENT OF GOVERNMENTAL INTEREST

The Government has rights in this invention pursuant to Contract No. SDIO 84-89-C-0047 awarded by the Department of the Navy.

This is a continuation-in-part of U.S. Ser. No. 07/869,581, filed Apr. 16, 1992 now abandoned.

BACKGROUND OF THE INVENTION

1. Field of the Invention

The present invention relates generally to high speed data transmission and, more specifically, to circuit apparatus for compensating for different amounts of propagation delay when gathering data from different data sources. Such a high speed data transmission circuit equalizes the delay associated with data sources in general and thereby eliminates the effects of nonuniform transmission conditions.

2. Description of Related Art

High speed data processing circuits of the type suitable for spacecraft operations principally function to gather high rate digital data from several locations. The data is then multiplexed into a single data stream at the same data bit rate. A conventional prior art solution to gathering high rate digital data is to generate control signals and clock pulses in the central system which are then distributed to data sources with the idea that the delay inherent in the propagation path from each particular data source will be small compared to the data bit period. However, the aggregate delay of cable propagation delays, driver, receiver and logic element propagation delays (a function of temperature) inherent in spacecraft systems can exceed several periods of the clock signal at extremely high data rates. The accumulation of these internal delays makes this approach undesirable at high operating frequencies because delay variations can preclude proper formation of a continuous output data stream.

One pulse transmission system shown in U.S. Pat. No. 4,818,995 converts original signals into line coded signals and transmits them after aligning the timings of the blocks receiving side. As shown in this patent, each output of the parallel receiver circuits 5a to 5c is temporarily stored in delay compensation circuits 7a to 7c. By using a reference clock signal the phases of the read-out pulse blocks are made to equal each other. A specific shortcoming of the system disclosed in U.S. Pat. No. 4,818,995 relating to the problem addressed here is that it simply adjusts relative timing between simultaneously received pulses and confines itself to address alignment pulses which are all transmitted from the same transmitter to the same receiver under the same ambient conditions.

SUMMARY OF THE INVENTION

The present invention improves over the prior art by sensing the total data gathering delay for each data source and applying the result to control a programmable delay element in such a manner as to equalize the delay inherent in the transmission paths of all data sources. In the high speed data system characterizing the invention, high rate serial digital data from a plurality of data sources is multiplexed into a single continuous data stream by a central data control unit. The amount of the propagation delay inherently present in each of the data sources is different and is known to depend upon such factors as temperature and propagation constants of the original lines. A feature considered most advantageous when sequentially processing data into a composite data stream is to have the final data bit from one source followed, during the next clock cycle, by the first data bit arriving from the next data source. The invention accomplishes this requirement by controlling the total delay from each data source by introducing a compensating delay amount. The amount of delay introduced to each data source is adjusted automatically following each data transfer based upon the occurrence of a known data transition in each data frame.

Accordingly, an object of the invention is to compensate, in a high speed data transmission system, for propagation characteristics when gathering data from multiple data sources.

Another object of the invention is to multiplex into a continuous data stream sequential blocks of high speed digital data having no separation between consecutive data blocks.

A further object of the invention is to force the first data transition from each of a number of data sources to occur at a known time relative to a central unit epoch.

Still another object of the invention is a high speed data transmission system whose characteristics make it extremely adaptable for use in outer space.

Yet a further object of the invention is a circuit which compensates for multibit propagation delays.

Other objects of the invention will become apparent from the following detailed description of the embodiment of the present invention when taken in conjunction with the accompanying drawings.

DESCRIPTION OF THE INVENTION EMBODIMENT

Figure 1:
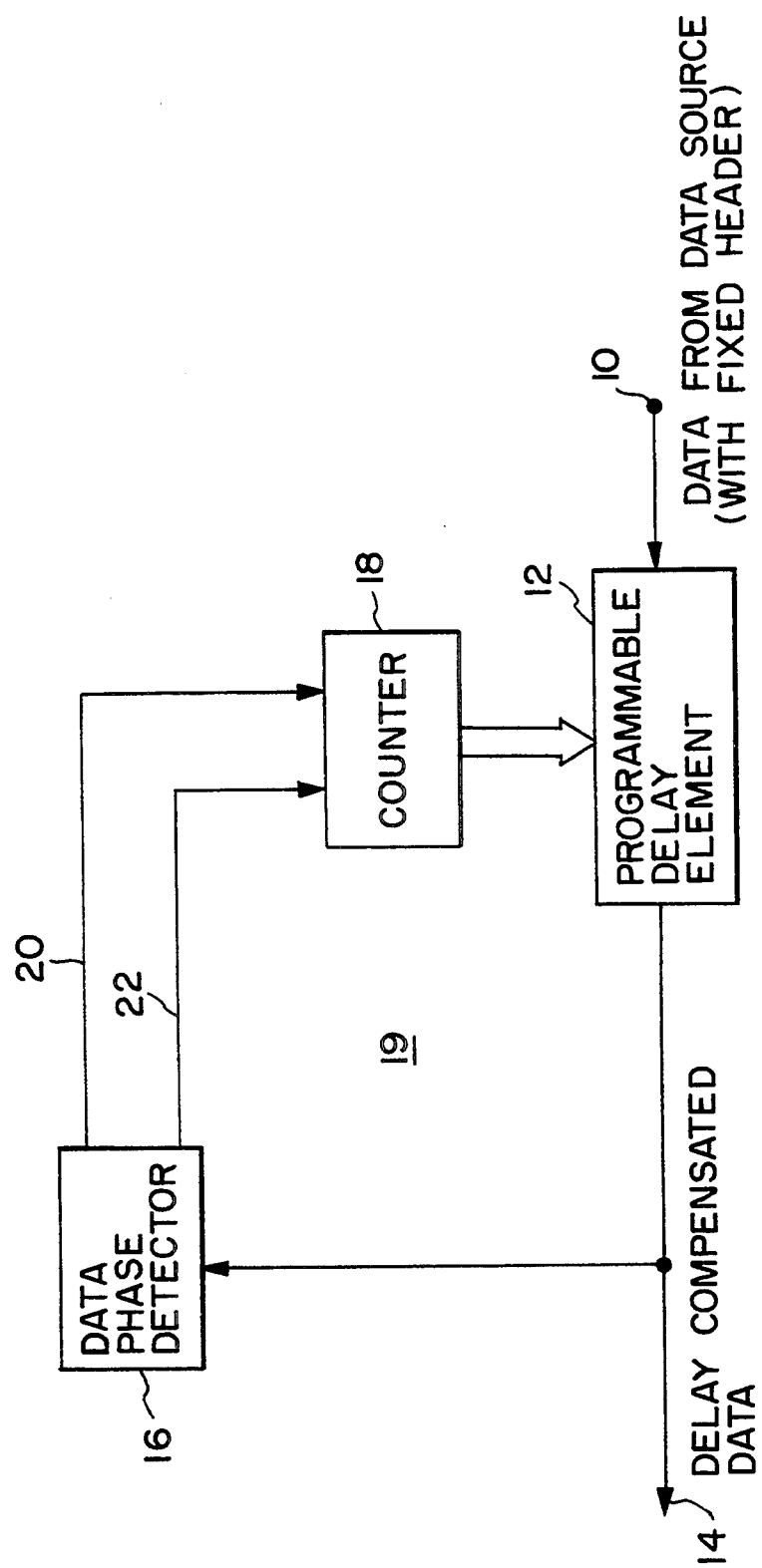
FIG. 1 is a block diagram which generally shows a high speed delay compensation network according to the present invention.
Figure 2:
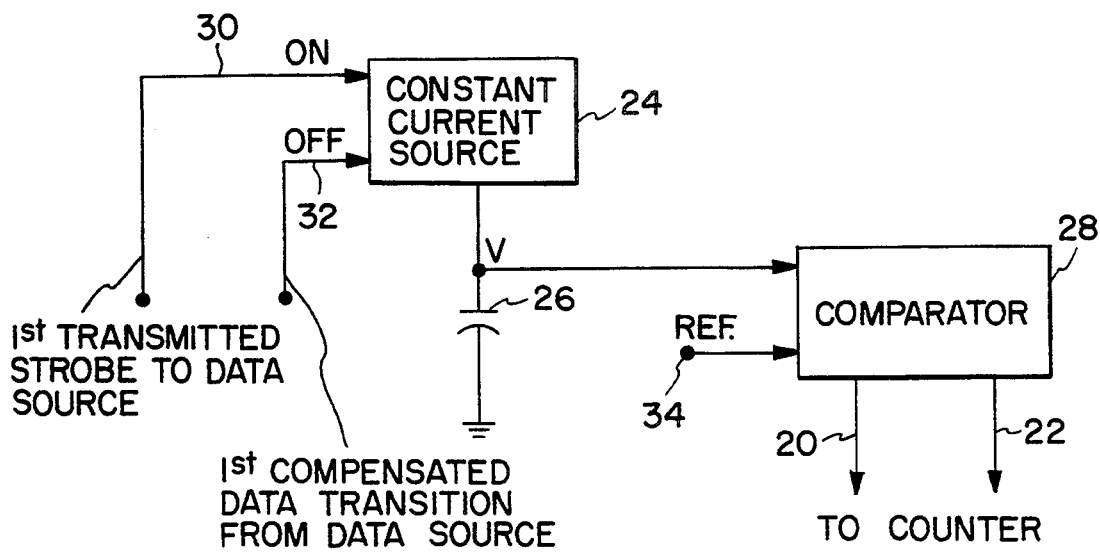
FIG. 2 is a block diagram which shows in detail one form of the data phase detector employed in FIG. 1.

In describing the structure and variations of the present invention, and in making reference to FIGS. 1 and 2, it will be helpful at the outset to consider that a spacecraft has a number of centers and each of the centers is responsible for producing a digital stream of uncompensated data which represents the analog of the signal being measured. Each source includes a propagation path (not shown) which has a delay inherent for no reason other than it has a finite length. Another aspect which contributes to inherent delay comes from data center processing delay, i.e., data center response time to a central data formatter generated data request, which can change depending on ambient temperature. The data delay associated with data center processing, when added to the delay attributed to the length of the propagation path, represents a factor which herein will be described as "inherent delay". Thus, in FIG. 1, signals comprising uncompensated data from a data source (not shown) are applied to an input terminal 10 of a programmable delay element 12. The signals in programmable delay element 12 are converted into delay-compensated high speed signals which appear at output terminal 14. The delay compensated signals are also applied to a data phase detector 16 connected in series with a counter 18 in a feedback loop 19 including the programmable delay element 12, data phase detector 16 and counter 18.

Programmable delay element 12 is a digitally programmable delay unit available commercially from Data Delay Devices, Inc. under the designation PDU 1016H. The programmable delay element 12 may be described generally as an Emitter Coupled Logic (ECL) 4-bit programmable delay line. The header which forms the first part of all data applied to terminal 10 represents a fixed header 7F prefaced to all of the data sources. The 7 (digital 0111) represents the starting point for each of the various data sources whose digital outputs are fed to the apparatus shown in FIG. 1. The zero to one transition of the fixed header is produced by the data source upon the first data strobe following activation of the read out gate signal, and this known transition is used by the phase detector to determine the correct value of imparted delay.

As will be apparent by reference to FIG. 1, data with a fixed header is applied sequentially from a plurality of digital data sources to individual programmable delay elements 12, where a controlled amount of delay is imparted to the data depending on the amount of delay inherent in the propagation path for that particular data source due to such variables as cable, driver, receiver and/or logic gate delays. The total (inherent and imparted) delay associated with gathering data from a particular source is detected by data phase detector 16. The output of detector 16 is applied to positive and negative control lines 20 and 22, respectively, and is used to either increment or decrement counter 18 based upon the comparison between the total data delay from that source and a predetermined reference delay. Counter 18, in turn, provides closed-loop control of the programmable delay element 12 to impart the proper amount of delay needed to equally compensate for the delay inherent in each of the multiple data sources. Stated differently, the counter 18 produces control signals which either add to or subtract from the imparted delay added in the path of the signal which comes from each data source.

One embodiment of the data phase detector shown in FIG. 1 is illustrated in FIG. 2. It comprises a constant current source 24 connected to charge a capacitor 26 during the period from (a) when a data source is first strobed, that is, requested by a central control unit to read out its data, and (b) when the first zero to one transition of the delay compensated data from that source first appears at the output terminal 14 of the programmable delay element 12. The voltage on capacitor 26 is applied to a comparator 28 where it is compared to a predetermined reference whose value is selected in accordance with the worst case delay from any of the data sources. The output of comparator 28 controls the counter 18 by means of the control lines 20 and 22. Thus, in turn, the programmable delay element 12 is effected to adjust the delay imparted to the incoming uncompensated data at terminal 10 in such manner as to form a total delay equal to that for all of the other data sources.

The apparatus embodying the invention may best be described by referring to FIG. 1 taken in conjunction with FIG. 2. In FIG. 1, for example, inputs to the programmable delay element 12 provided by the loop 19 result in control by counter 18 which either adds to or subtracts from the imparted delay added into the path of the signal from the uncompensated data source. With the inherent delay of the data from the data source now having been adjusted by the imparted delay within the programmable delay element, this data, now compensated for inherent delay, appears at output terminal 14. In order to have the counter 18 either increment or decrement the imparted delay in the programmable delay element, the compensated data is simultaneously applied to phase detector 16. As previously described, the phase detector produces two signals, on the lines 20 and 22, which instruct the counter 18 to increment the delay in the signal through the programmable delay element 12 or command the counter 18 to decrement the delay in the programmable delay element.

As further shown in FIG. 2, the data phase detector 16 includes the constant current source 24 connected in series with the capacitor 26 to ground. Initially, capacitor 26 is allowed to charge from ground to a higher voltage depending on the current value of the imparted delay (t') plus inherent delay (t). In each case, the delay to be added to the data from the fixed data source is based upon the desired value of $t+t'$ (120 ns in this example). In FIG. 2, the constant current source 24 has input terminals 30 and 32 labelled ON and OFF. The ON lead 30 to the constant current source 24 is fed with a gate signal which is the first undelayed strobe to the data source, i.e., this is the first clock pulse following a gate signal which tells the data source to begin its transmission of the output data. The OFF signal at terminal 32 represents the first compensated data transition from the data source, that is, this is the delay compensated 0 to 1 data transition in the fixed 7F header. The time that it takes capacitor 26 to charge to its final voltage corresponds to the total delay, i.e., inherent delay plus compensating delay. Comparator 28 then compares the voltage on the capacitor 26 to a reference voltage supplied to terminal 34. The reference voltage at terminal 34 represents the voltage that would have been charged on capacitor 26 in the case where one assumes the desired delay (120 ns in this example) existed in the transmission path. The difference between the charge on capacitor 26 and the reference voltage, when applied to comparator 28, determines whether additional time is to be added to or subtracted from the programmable delay element 12 to cause the leading edge of the data from each data source to be delayed by an amount equal to 120 ns.

Figure 3:
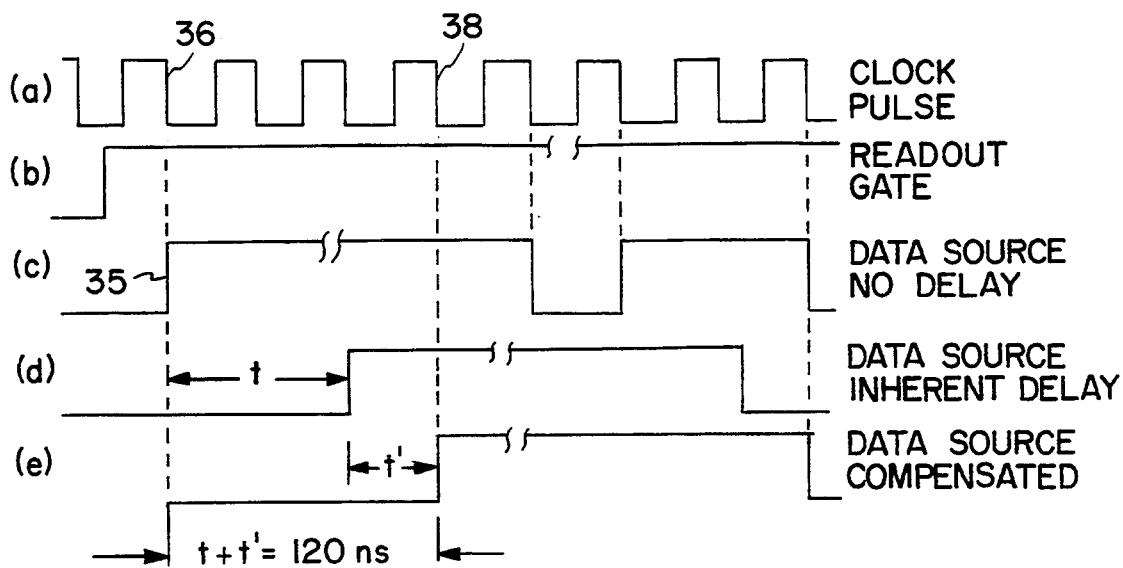
FIG. 3 is a timing chart which illustrates the operation of the embodiment shown in FIG. 1; and, FIG. 4 shows the delay compensation network embodying the invention connected as part of a plurality of data sources associated with a central data processing unit.

The principles of operation of the high speed data transmission network embodying the invention will be further described by reference to the waveforms in FIG. 3. In FIG. 3, the waveform 3(a) represents a clock pulse which is emerging from the data formatter (not shown). The waveform 3(b) represents the read-out gate which also comes from the data formatter. The waveform 3(c) illustrates the read-out data source under the assumed ideal situation where no inherent delay exists in the data source or the transmission line. With this assumption, it will be noted that the leading edge 35 of the waveform 3(c) coincides with the first negative excursion 36 of the clock pulse to occur after the beginning of the read-out gate. This represents an ideal situation and will never occur because of the understanding that delays intrinsically exist in the propagation path for the reasons given above.

With this background, and looking now at waveform 3(d), this waveform is a presentation of data from a data source with an inherent delay t. The time t shown in the waveform 3(d) represents the delay associated with propagation of the data from the data source. In accordance with the invention, it now becomes necessary to add a delay, shown as t', to the delay t to make the sum of t and t' equal 120 ns. The processing of the charge developed on the capacitor 26 adds delay to the data stream such that the sum of inherent delay t and the imparted delay t' equals the arbitrarily specified period of 120 ns. This total amount of delay will always amount to the arbitrary 120 ns and, as viewed in waveform 3(e), the delay is equal to the time associated with three periods of the data from the data source. The three periods shown in waveform 3(a) extend from the first negative excursion 36 of the clock after the appearance of the readout gate 3(b) to the fourth negative excursion 38 of the clock 3(a). The fourth negative excursion 38 of the clock 3(a) now coincides with the leading edge of the compensated data stream shown in waveform 3(e). In other words, the imparted delay is selected to be greater than the worst case total delay from any of the data sources. Since it is known that the inherent delay caused by transmission characteristics and any temperature effects should not equal 120 ns, the system according to the invention adopts the arbitrary figure of three clock periods at a bit rate of 40 ns per period and, within the constraints of 120 ns, forces the leading edge of each of the data streams to be compensated by 120 ns. This means that for each of the data sources the data applied to terminal 10 will always be delayed by the same amount (120 ns) so that in a serial stream of data which emerges from the multiplex format of the data formatter, no delay will occur between the final bit of one data stream and the first bit of the next data associated with a following data source. In other words, no more, and no less than 40 ns, will separate the end of one data stream and the beginning of the next data stream.

Turning now to FIG. 4, there is shown a central data processing unit 40 which gathers data from several real time high rate data sources 1 . . . N each shown feeding into the delay compensation circuit shown in FIG. 1. Elements in the #N delay compensation circuit are labeled with numbers which correspond to the elements depicted in FIG. 1. The CDPU multiplexes the data into a composite real time data stream in which the final data bit from one data source is followed (in the very next bit period) with the first data bit from the succeeding data source. As in traditional spacecraft data systems, the central data processing system generates read out gate (ROG), frame marker, and clock signals which are distributed to the data sources. Read out gate signals are generated sequentially, with the gate signal to the selected source becoming active during the negative phase of the clock cycle. A selected (ROG active) data source shifts data on the (negative) edge of the clock from the central data processing system, while the central data system samples input data on the opposite (positive) clock transition. At high clock rates (25 MBPS in this example) the sum of: (1) spacecraft harness clock signal propagation delay (e.g., 10-15 feet which is equivalent to 0-25 ns), (2) data source internal (data valid) propagation delay from the data source input clock transition to the appearance of valid output data at the data source connector (typically 0-35 ns), (3) spacecraft harness data signal propagation delays (0-25 ns) and (4) central data processing unit clock output driver and data input receiver element propagation delays (0-10 ns) can amount to several clock periods and the differences and uncertainties in these delays (temperature, location and component selection effects) can exceed the clock period. As a result of the magnitude and uncertainty of these cumulative delays, the formation of a contiguous data output using the traditional synchronous spacecraft data gathering method is precluded. Adjusting the timing of the ROG signal will not function to permit formation of a contiguous data output since the data source will shift on the clock edge regardless of the timing of the ROG signal and "sub-bit period" propagation variations cannot be compensated and data system input register set-up time cannot be guaranteed.

In a high speed serial transmission system, such as one representative of the present invention operating at 25 megabits per second, the delay enforced on each data stream guarantees that no data bits from the next data stream will be lost because the delay inherent in the system exceeds the bit time (i.e., is some value greater than 40 ns). It therefore will be appreciated that in capturing each of the leading edges of the data streams from each data source such that each is spontaneously required to be delayed by the arbitrarily adopted fixed period of 120 ns, when compared to ideal conditions, ensures full and accurate real time delivery of all the bits associated with each data source thus allowing for no loss of the data from any of the data sources.

Obviously many modifications and variations of the present invention are possible in light of the above teachings. It is therefore to be understood that, within the scope of the appended claims, the invention may be practiced otherwise than specifically described.

I claim:

1. Apparatus for compensating for an inherent delay in the propagation path of a data source carrying a stream of digital signals, said apparatus comprising:
    an input terminal to which said digital signals are applied;
    digitally programmable means connected to said input terminal for introducing a controllable amount of imparted delay to said digital signals;
    phase detector means responsive to the output of said digitally programmable means for detecting the sum of the inherent and imparted delays to which said digital signals are subjected;
    counter means controlled by said phase detector means for causing said programmable delay means to impart to said digital signals a delay based upon the inherent delay in said data source and a predetermined reference delay; and
    wherein said phase detector means includes a capacitor charged to a value based upon said predetermined reference delay.

2. Apparatus for compensating for an inherent delay in the propagation path of a data source carrying a stream of digital signals, said apparatus comprising;
    an input terminal to which said digital signals are applied;
    digitally programmable means connected to said input terminal for introducing a controllable amount of imparted delay to said digital signals;
    phase detector means responsive to the output of said digitally programmable means for detecting the sum of the inherent and imparted delays to which said digital signals are subjected;

counter means controlled by said phase detector means for causing said programmable delay means to impart to said digital signals a delay based upon the inherent delay in said data source and a predetermined reference delay; and wherein said phase detector means includes a capacitor charged to a value based upon said predetermined reference delay; and further including means for comparing a predetermined reference voltage to a charge on said capacitor.

3. Apparatus for compensating for an inherent delay in the propagation path of a data source carrying a stream of digital signals, said apparatus comprising:

an input terminal to which said digital signals are applied;

digitally programmable means connected to said input terminal for introducing a controllable amount of imparted delay to said digital signals;

phase detector means responsive to the output of said digitally programmable means for detecting the sum of the inherent and imparted delays to which said digital signals are subjected;

counter means controlled by said phase detector means for causing said programmable delay means to impart to said digital signals a delay based upon the inherent delay in said data source and a predetermined reference delay; and wherein said phase detector means includes a capacitor charged to a value based upon said predetermined reference delay; and further including a comparator which compares the voltage on said capacitor to a predetermined reference voltage.

4. A method for compensating for different amounts of propagation delay present when gathering streams of digital data from a plurality of different data sources each of which has an inherent path delay, the method comprising:

detecting the inherent path delay delay for each of said plurality of different data sources;

delaying the leading edge of the digital data from each of said plurality of different data sources by imparting a delay in an amount based upon the difference between the inherent path delay for each of said plurality of different data sources and a predetermined reference delay;

multiplexing high rate serial data from said plurality of different data sources into a single contiguous data stream read sequentially into a central data processing unit, and separating the end of one stream of digital data from each of said plurality of different data sources and the first bit in the stream of digital data from the following one of said plurality of different data sources by a time no more, and no less than, one clock cycle.

5. The method according to claim 4, wherein the inherent path delay plus said delay imparted to the leading edge of the digital data from each of said plurality of different data sources is greater than the worst case inherent path delay from any of said plurality of different data sources.

* * * * *

UNITED STATES PATENT AND TRADEMARK OFFICE
CERTIFICATE OF CORRECTION

PATENT NO. : 5,379,299
DATED : January 3, 1995
INVENTOR(S) : Paul D. Schwartz

It is certified that error appears in the above—identified patent and that said Letters Patent is hereby corrected as shown below:

Column 8, line 9, delete "delay", first occurrence.

Signed and Sealed this

Eleventh Day of April, 1995

Attest:

BRUCE LEHMAN

Attesting Officer     Commissioner of Patents and Trademarks